Jan. 6, 1942.   E. P. HALL   2,269,019
WARNING DEVICE
Filed March 3, 1939

INVENTOR
Edward Payson Hall.
BY
his ATTORNEY

Patented Jan. 6, 1942

2,269,019

UNITED STATES PATENT OFFICE 2,269,019

WARNING DEVICE

Edward Payson Hall, Ferguson, Mo., assignor, by mesne assignments, to Square D Company, Detroit, Mich., a corporation of Michigan Application March 3, 1939, Serial No. 259,565

9 Claims. (Cl. 177—311)

This invention relates to warning devices and more particularly to a device for indicating conditions of ice formation, such as the formation of ice on the surfaces of aircraft.

It is well known that one of the hazards of aerial navigation is the formation of ice on the surfaces of aircraft under certain atmospheric conditions. The forming of ice on the aircraft changes the airfoil, increases the load and in many cases, impairs proper functioning of the control members. Various means, such as "de-icers" have been adopted for removing incipient ice layers and for preventing the building up of substantial ice layers. However, in order that such ice preventing and removing devices shall be effective, it is necessary that the pilot be warned when ice forming conditions prevail. It is also often desirable that a warning be given when the temperature falls to certain low values, even although ice-forming conditions do not exist.

In accordance with an illustrative embodiment of the present invention, an ice warning alarm or signalling device is provided which comprises an indicator, such as a lamp, the energization of which is controlled by the variation in resistance of a temperature-responsive, varying resistance element. Means are provided for alternately heating the varying resistance element and permitting it to cool under the influence of the atmospheric temperature whereby to intermittently energize the indicator. The varying resistance element is so positioned that ice can form about the same and when this occurs the indicator is correspondingly affected to indicate the presence of ice.

The device preferably is provided with means for automatically setting the same in operation when the atmospheric conditions approach or reach those at which ice may form or any selected low temperature. Thus the device is normally de-energized and does not constitute a drain upon the electric power of the aircraft. The device is also provided with means for manually or automatically operating the heating means, whereby to melt and remove ice which is formed about the varying resistance element.

Accordingly, an object of the present invention is the provision of an alarm or signalling device which will operate automatically to indicate either the existence of or the approach of atmospheric conditions conducive to ice formation.

Another object of the present invention is the provision of an ice warning device which is simple in construction and reliable in operation and which can be readily installed on aircraft.

Still another object of the invention is the provision of an ice warning device which is normally deenergized and which is automatically energized and prepared for operation when atmospheric conditions approach those at which ice formation takes place.

Still another object of the invention is the provision of ice warning device which has means associated therewith for removing ice which may have formed about or upon the exposed, operating portions of the device.

Another object of the invention is the provision of a device capable of warning both of the existence of low atmospheric temperature and also conditions of ice formation.

Various other features and advantages of the invention will be apparent from the following particular description and from an inspection of the accompanying drawing.

Further aims, objects and advantages of this invention will appear from a consideration of the description which follows with the accompanying drawing showing for purely illustrative purposes embodiments of this invention. It is to be understood, however, that the description is not to be taken in a limiting sense, the scope of this invention being defined in the appended claims.

Referring to the drawing.

Figure 1:
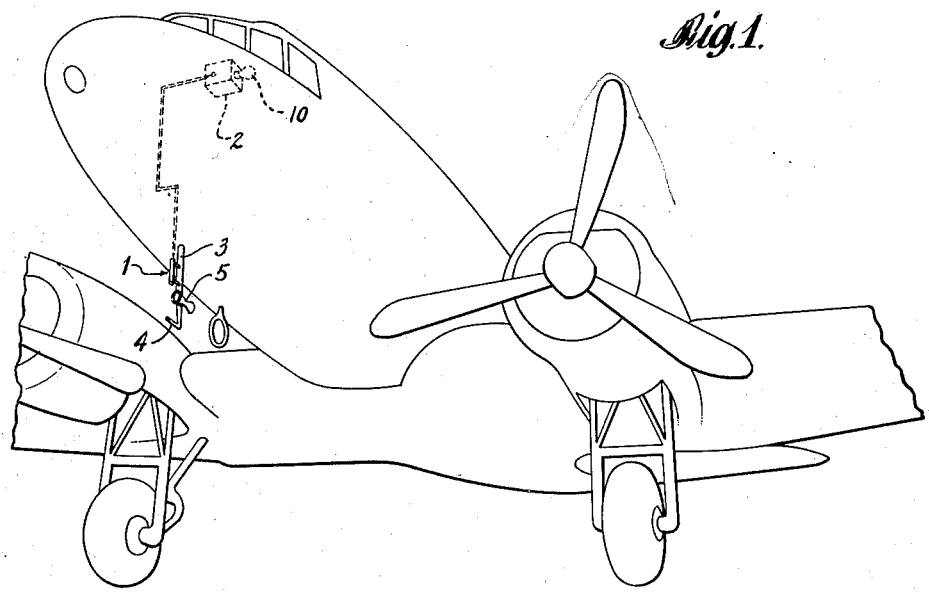
Fig. 1 is a somewhat fragmentary perspective view of a portion of an aeroplane illustrating diagrammatically one manner of mounting the ice warning device on an aeroplane.

In the following description and in the claims, various details will be identified by specific names for convenience, but they are intended to be as generic in their application as the art will permit. Like reference characters denote like parts in the several figures of the drawing.

Referring to Fig. 1 of the drawing, the device preferably comprises two portions 1 and 2 (both indicated diagrammatically in Fig. 1), which, for convenience, are designated herein as the "outside portion" and the "inside portion" respectively. The outside portion 1 is mounted on or adjacent a portion of the aircraft at which it is desired to determine whether or not ice forming conditions prevail. Preferably, the portion of the aircraft on which ice first forms is selected for receiving the outside portion 1, in order that the earliest possible indication of ice forming conditions may be obtained. One suitable location for the outside portion 1 is the strut 3 which supports the pitot-static tube 4, the outside portion 1 being suitably attached to or built into the strut. However, if desired, the outside portion 1 may be mounted on one of the airfoil surfaces or in the throat of the Venturi tube 5, as hereinafter more fully explained.

The inside portion 2 is mounted in a convenient location, preferably on or adjacent the instrument panel (not shown). Where a visual indicator is employed it should, of course, be within the sight of the pilot, but where an audible indicator is used, it can be hidden, so long as it is within the audible range of the pilot.

Figure 2:
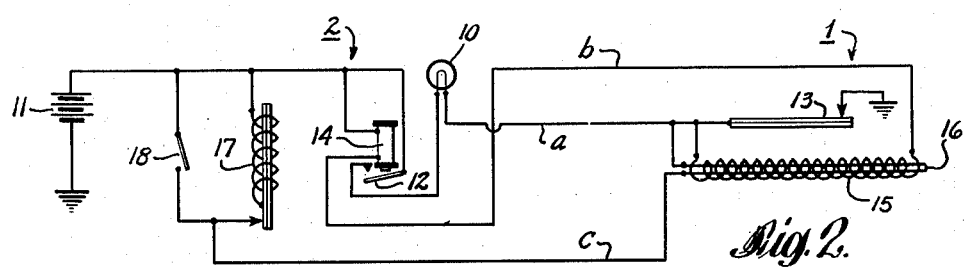
Fig. 2 is a partially schematic wiring diagram ilustrating the several elements of the device and the electric connections between the same.

Referring now particularly to Fig. 2, there is illustrated schematically a wiring diagram of one form of ice warning device constructed in accordance with the invention. Although the several portions of the apparatus have been shown for the purposes of illustration as being divided into two portions, it will be understood that certain of the elements may be located other than as shown.

The device comprises an indicator, which in the present illustrative example, is of the visual type and comprises an electric indicator lamp 10. The indicator lamp 10 is connected in a circuit $a$ in series with a suitable source of electrical energy, such as a battery 11, a normally open relay switch 12, and a thermostatic switch 13. The thermostatic switch 13 serves as a master switch and is operative to open the circuit $a$, as well as the other circuits hereinafter described.

The indicator lamp 10 should be located for convenient observation by the pilot, as explained above.

The thermostatic switch 13 is located preferably at or near the point at which it is desired to indicate icing conditions, and is adapted to respond to atmospheric temperatures. Preferably, it is not directly exposed, but is housed in a suitable compartment or housing (not shown) to protect it from injury or clogging due to icing conditions.

Preferably, the thermostatic switch 13 is adjusted so as to close at a temperature slightly above the highest temperature at which ice will form, thus insuring the operation of the device when ice-forming temperature is approached. Where the device is to be used to indicate that the atmospheric temperature is at or below a predetermined temperature, the thermostatic switch 13 is adjusted to close at such temperature.

The relay switch 12 is controlled by a relay coil 14 which is connected in a second circuit $b$ which includes also in series a varying resistance element 15, as well as the thermostatic switch 13 and the battery 11.

The varying resistance element 15 comprises a conductor which has a relatively high thermal co-efficient of resistivity so that upon a decrease in temperature, the electrical resistance of the coil is substantially decreased. In the present example, the varying resistance element 15 takes the form of a coil of relatively fine wire suitably mounted by insulating means (not shown) at or near the point at which icing conditions are to be indicated. It should be directly exposed to the atmosphere for reasons which will hereinafter appear.

Associated with the varying resistance element 15 is a heating element 16, connected in a circuit $c$ which includes in series a thermostatic interrupter 17, as well as the battery 11 and the thermostatic switch 13.

The heating element 16 is disposed closely adjacent the varying resistance element 15 in order to heat the same. It has been found convenient to mount the heating element on insulators (not shown) and to wind the varying resistance element about the heating element, as illustrated diagrammatically in Fig. 2. The heating element is formed by conductors which are turned back upon themselves for the purpose of providing a non-inductive resistance, thus preventing the inducing of any E. M. F. in the varying resistance element when the heating element is energized or deenergized. Both the varying resistance element 15 and the heating element 16 should have relative low heat storage capacity so that they will be suitably sensitive to changes in temperature. Also, any associate structure, such as cover insulators and the like, should be so constructed as to minimize heat storage.

The thermostatic interrupter 17 should be located at a point where the ambient temperature is substantially constant and therefore conveniently is located within the pilot's compartment.

A switch 18, which is preferably manually operable, is provided for short circuiting the thermostatic interrupter 17 to complete a steady heating current through the heating element 16 when desired. The switch 18 preferably is located conveniently for operation by the pilot.

The operation of the device is as follows:
When the aircraft is proceeding in an atmosphere at a temperature substantially above that at which ice will form, the thermostatic switch 13 is open and all of the circuits are de-energized. Under these conditions the relay switch 12 is open and the indicator lamp 10 is de-energized; the thermostatic interrupter 17 is closed but is not energized.

When the atmosphere surrounding the aircraft approaches the temperature at which ice forms, or any other predetermined temperature at which the device is set to operate, the thermostatic switch 13 closes. This completes the circuit $c$ through the thermostatic interrupter 17 and the heating element 16, and the circuit $b$ through the relay coil 14 and the varying resistance element 15.

Since the varying resistance element 15 has been cooled by the air flowing past it, its resistance is low and it therefore permits sufficient current to flow in the circuit $b$ to cause the relay coil 14 to close the normally open relay switch 12. Thus the circuit $a$ is closed whereby the indicator lamp 10 is energized and provides an indication that the temperature has dropped to the predetermined temperature.

Owing to the current flowing through the heating element 16, the temperature of the heating element 16 rises until the thermostatic interrupter 17 opens, which opens the circuit $c$ and de-energizes the heating element. The heating element 16 is then cooled by the air stream until the thermostatic interrupter 17 again closes. Thus, the heating element 16 is alternately heated and cooled.

When the heating element 16 is energized it causes an increase in the temperature of the variable resistance element 15, thereby causing a corresponding increase in the resistance of the varying resistance element 15. Conversely, when the heating element is de-energized, the varying resistance element 15 is cooled, owing to the cooling effect of the adjacent atmosphere. Thus, the varying resistance element 15 is alternately heated and cooled and the resistance thereby is alternately increased and decreased.

When the varying resistance element 15 is cooled, its resistance is sufficiently lowered to permit sufficient current to flow through the relay coil 14 to close the relay switch 12. On the other hand, when the varying resistance element 15 is heated by the heating element 16, its resistance becomes sufficient to reduce the current flowing in the relay circuit 14 to such an extent as to permit the switch 12 to open and de-energize the indicator lamp 10. Thus, the indicator lamp 10 will be periodically energized and de-energized to provide a flashing light indication that the temperature of the atmosphere is at or below the predetermined temperature.

In the event that the atmospheric temperature remains the same, the flashing light indication will continue. However, if the atmospheric temperature rises above the predetermined temperature, the thermostatic switch 13 will open and de-energize all of the circuits and the light will be de-energized. In the event that the temperature of the atmosphere remains below the predetermined temperature, the flashing light signal will be provided, as above explained.

Should ice-forming conditions be encountered, ice will form on the varying resistance element 15 and the effective mass of this element will be increased. Since the heat input to the varying resistance element 15 remains substantially the same, the maximum temperature to which the varying resistance coil 16 is heated is correspondingly reduced. If the resistance element is wound loosely about the heating element, the resistance element may become ice covered thus causing a further reduction in temperature. Thus, it will be seen that the fluctuation of temperature of the varying resistance element 15 occurs throughout an increasingly narrower range as ice is deposited. Accordingly, the range of variation of resistance of the varying resistance element 15 and the fluctuations in current passing therethrough will likewise be narrowed.

The several constants of the circuits are so chosen that when a relatively thin coating of ice has been deposited, the fluctuations of current flowing through the relay coil 14 are limited to a narrow range above the current necessary to energize the relay coil 14 and, accordingly, the relay switch 12 remains closed and a steady light signal is provided. This indicates to the pilot that ice-forming conditions prevail.

When the pilot desires to determine whether or not ice-forming conditions still exist, he can close the switch 18 to cause a steady heating current to flow through the heating element 16 and thus quickly melt the ice from around the varying resistance coil 15.

In the event that the temperature remains below the predetermined temperature but icing conditions no longer prevail, a flashing light signal will be provided. However, if icing conditions still exist, the flashing light signal will change to a steady light signal in the manner above described.

Figure 4:
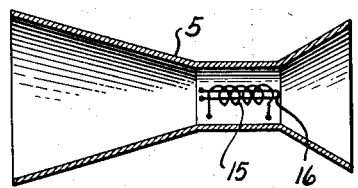
Fig. 4 is a somewhat diagrammatic, enlarged longitudinal sectional view through a Venturi tube showing one mode of locating the varying resistance element and the heating element of the device.

Various modifications of the invention may be made within the device herein disclosed without departing from the spirit of the invention. For example, instead of mounting the varying resistance coil 15 and the heating element 16 on the strut 3, as illustrated in Fig. 1, they may be disposed in the throat of the Venturi tube 5 in the manner shown somewhat diagrammatically in Fig. 4. The Venturi tube 5 may, if desired, be carried on the strut 3, or may be located at any other suitable place. Owing to the reduced pressure in the Venturi tube, ice-forming conditions occur about the varying resistance element 15 somewhat prior to the time when they occur at the airfoil surfaces of the aircraft and thus advance notice of ice-forming conditions are obtained. Where the device is thus mounted, it will operate in a manner generally similar to that above described but slightly in advance as regards the occurrence of ice-forming conditions.

In certain cases the icing conditions may cause a sufficient narrowing of the range of fluctuations in current so that a flashing light indication can be provided without the use of a relay switch. A circuit arrangement suitable for carrying out this embodiment of the invention is illustrated in a partially diagrammatic manner in Fig. 3.

It will be noted that the device comprises a lamp 110, a battery or other source of energy 111, a variable resistance element 115, and a thermostatic switch 113 connected in series to form one circuit d. A heating element 116 and a thermostatic interrupter 117 are connected in series with the thermostatic switch 113 and the battery 111 to provide a second circuit e. A manual switch 118 may be provided for shunting the thermostatic interrupter 117.

Figure 3:
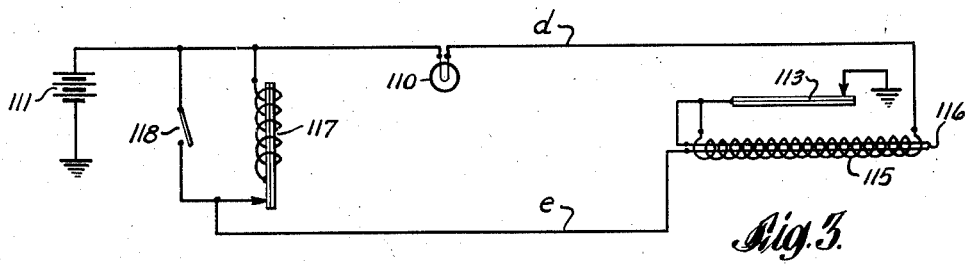
Fig. 3 is a partially schematic wiring diagram illustrating another embodiment of the invention.

The embodiment of the invention illustrated in Fig. 3 is analogous to the operation of the device illustrated in Fig. 2. However, the flashing of the light is accomplished by variation in the current flowing through the varying resistance element 115.

When the aircraft passes into an air zone at a temperature at or below the predetermined temperature, the device is set in operation by the closing of the thermostatic switch 113. The circuit d is closed through the indicator lamp 110 and the varying resistance element 115 to energize the lamp 110. The circuit e also is closed and a heating current flows through the thermostatic interrupter 117 and the heating element 116 to heat the varying resistance element 115. The varying resistance element 115 is heated and its resistance becomes sufficient to reduce the current flowing through the indicator lamp 110 so that the lamp is dimmed or goes out entirely, depending upon the physical constants of the circuit.

When the thermostatic interrupter 117 opens, the heating current ceases and the varying resistance element 115 is cooled by the air stream sufficiently to permit current to flow through the lamp 110 and relight the same. Thus, a fluctuating current is passed through the indicator lamp 110 and the lamp is alternately brightened and dimmed (or in some cases is alternately lighted and darkened), thereby providing an indication of ice-forming conditions.

When the ice deposit reaches a sufficient thickness, the variation in the intensity of the current passing through the lamp 110 is so narrow that a relatively steady current flows through the lamp 110 and the lamp provides a steady light indication if ice-forming conditions prevail.

In certain cases, automatically operating means may be provided for closing the heating circuit through the heating element for a sufficient time to melt off any ice which may have formed thereon. Therefore, it is not necessary for the pilot to manipulate any manually operated means. Various automatic means may be provided for this purpose. For example, a second thermostatic interrupter (not shown) may be substituted for the manually operated switch. Such thermostatic interrupter should be adapted to close for a relatively short period of time and to remain open for a relatively longer period.

Where a second thermostatic interrupter is employed, it will be seen that the operation of the device will be generally similar to that above described. However, the second thermostatic interrupter will close periodically during the entire time the device is energized (both when ice is not forming and when ice is forming) a sufficient length of time to melt the ice from the varying resistance coil. In the event that ice is no longer forming, the lamp will return to its flashing indication, but if ice is still forming, the lamp, after a short period of flashing, will return to its steady indication.

From the foregoing it will be seen that the present invention provides a device which affords positive indication of the approach or attainment of ice-forming conditions in the atmosphere surrounding the aircraft on which the device is located. The device is automatically energized upon the approach of ice-forming temperature and automatically operates to give the desired warning.

The device is simple in construction and relatively inexpensive to manufacture and install. It is light in weight and does not require any substantial power for its operation. Furthermore, it is only energized during the prevalence of ice-forming temperature and thus does not unduly expend the electrical energy.

While certain novel features of the invention have been disclosed herein, and are pointed out in the annexed claims, it will be understood that various omissions, substitutions and changes may be made by those skilled in the art without departing from the spirit of the invention.

What is claimed is:

1. An ice warning device comprising a first circuit including an indicator lamp and a switch controlling the energization of said indicator lamp, a second circuit including an operating coil controlling said switch and a varying resistance element, and a third circuit including an interrupter and a heating element for heating said varying resistance element, said varying resistance element having its windings exposed to the atmosphere wherein ice forming conditions are to be ascertained whereby a formation of ice on said element will decrease the temperature fluctuations of said element resulting in a decrease in operating current insufficient to operate said switch.

2. An ice warning indicator for aircraft comprising, in combination, an indicator; a relay for controlling a flow of electrical energy to said indicator; a resistor having a high temperature coefficient of resistance connected to control said relay, said resistor being exposed to a stream of atmospheric air wherein ice forming conditions are to be ascertained to offer decreased resistance to a flow of current therethrough if covered with ice; a heating element positioned to heat said resistor; and means for supplying electrical energy to said heating element, said means including a periodic interrupter.

3. In an ice warning indicator for aircraft the combination with an element sensitive to the formation of ice thereon, of means for directing onto said element air at a pressure below the pressure of the atmospheric air wherein ice forming conditions are to be ascertained, whereby ice is formed on said element in anticipation of atmospheric ice forming conditions at slightly higher temperatures than those at which ice is actually formed on the craft.

4. In an ice warning indicator for aircraft the combination with an element sensitive to the formation of ice thereon, of a constricted air duct for a sample of atmospheric air to be tested for ice forming conditions, said conduit having a reduced-pressure portion, said element being located in said portion whereby ice is formed on said element in anticipation of atmospheric ice forming conditions at slightly higher temperatures than those at which ice is actually formed on the craft.

5. In an ice warning indicator for aircraft the combination with an element sensitive to the formation of ice thereon, of a Venturi conduit exposed to atmospheric air, said conduit having a constricted portion, said element being located within said portion, whereby ice is formed on said element in anticipation of atmospheric ice forming conditions at temperatures slightly higher than those at which ice is formed on the craft.

6. An ice warning device comprising, in combination, an electrical heating means; means for supplying said heating means with energy at a predetermined cycle; a temperature responsive means adjacent said heating means, thereby periodically heated by said heating means, said heating means and said temperature responsive means being exposed to a stream of atmospheric air wherein ice forming conditions are to be ascertained; and warning means controlled by said temperature responsive means and discriminately actuated thereby at temperature fluctuations of said temperature responsive means of greater or lesser magnitude, whereby said warning means will give different signals under ice forming conditions than under conditions under which ice will not form.

7. An ice warning indicator comprising, in combination, an electrical heating means; means for supplying said heating means with energy at a predetermined cycle; a temperature responsive means adjacent said heating means, thereby periodically heated by said heating means, said heating means and said temperature responsive means being exposed to a stream of atmospheric air wherein ice forming conditions are to be ascertained; and indicating means controlled by said temperature responsive means in response to temperature fluctuations thereof said fluctuations being large under conditions under which ice will form and small under ice forming conditions.

8. An ice warning indicator comprising, in combination, an electrical heating means; means for supplying said heating means with energy at a predetermined cycle; a temperature responsive means adjacent said heating means, thereby periodically heated by said heating means, said heating means and said temperature responsive means being exposed to a stream of atmospheric air wherein ice forming conditions are to be ascertained; and indicating means controlled by said indicating means including a relay controlled by said temperature responsive means, said relay having an armature and being so adjusted that under large temperature fluctuations said armature will oscillate, while under small fluctuations it will remain in one extreme position, whereby a permanent signal is given under ice forming conditions.

9. An ice warning device comprising, in combination, an electrical heating means; means for supplying said heating means with energy at a predetermined cycle; a temperature responsive means adjacent said heating means, thereby periodically heated by said heating means, said heating means and said temperature responsive means being exposed to a stream of atmospheric air wherein ice forming conditions are to be ascertained to permit ice to form on said temperature responsive means; contact means controlled by said temperature responsive means and discriminately actuated thereby under ice forming and non-ice forming conditions; and a signal device controlled by said contact means whereby ice forming on said temperature responsive means is melted during each heating cycle putting said temperature responsive means in condition for a repeated test to ascertain whether ice forming conditions still prevail.

EDWARD PAYSON HALL.